3,094,501
WATER LOSS CONTROL OF AQUEOUS CEMENT SLURRIES BY ADDITION OF QUATERNARY AMMONIUM POLYMERS OR SULFONIUM POLYMERS
Winton W. Wahl, Tulsa, Okla., and Charles D. Dever, Saginaw, Mich., assignors to The Dow Chemical Company, Midland, Mich., a corporation of Delaware
No Drawing. Filed May 9, 1960, Ser. No. 27,473
11 Claims. (Cl. 260—29.6)

The invention lies in the art of well cementing and is concerned particularly with a novel cement composition and improved method of cementing a well employing the novel composition in an aqueous slurry which is accompanied by low water loss to the formation traversed by a well during the injection and setting of the slurry.

Aqueous hydraulic neat cement slurries have long been used during the drilling and the maintenance of wells for the production of fluids from subterranean formations. They are principally used to secure casings in place and to seal off zones in formations adjacent to or penetrated by the well, thereby to inhibit or deter the flow to the well of undesirable fluids or prevent or lessen the flow from the well back into the earth of fluids sought to be produced.

A difficulty associated with emplacing an aqueous cement slurry as desired in a well or formation traversed thereby is a loss of water from the slurry during the injection and setting thereof.

The loss of appreciable water to the formation from an aqueous cement slurry being injected down a well penetrating the formation usually causes contamination of the producing zone, loss of fluidity of the slurry (thereby increasing required pumping pressures and making satisfactory emplacement of the slurry difficult), prevents predicting sufficiently accurate pumping time and cement volume required, increases the cementing operation costs, and tends to result in a set cement having lower compression strength and non-uniform consistency often requiring work-overs and repeat squeeze jobs.

Ordinary neat cement slurries, i.e., those of an hydraulic cement and water, are characterized by high fluid loss in porous formations, the water of the cement slurries seeping away into the formation and the solids of the cement slurry tending to filter out on the face of the formation. Attempts to overcome this high water loss of conventional neat cement slurries have included the addition thereto of such additaments as latex emulsions, cellulose derivatives, and such natural polymeric substances as starch. Although the presence of such additaments has been found to lessen the fluid loss of cement slurries, certain inherent disadvantages are associated therewith, among which are increased thickening and setting times of the slurry, especially at elevated temperatures which are often-times encountered during the emplacement of cement in wells, and decreased compression strength of the set cement.

A desideratum, therefore, exists for an improved hydraulic cement slurry and method of use thereof which slurry undergoes low water loss to porous formations during the injecting and setting thereof but which is unaccompanied by objectional adverse concomitant effects.

This desideratum can be realized by incorporating into an hydraulic cement slurry, either by admixing with the dry cement or the water prior to intermixing the cement and water or to the cement slurry after such intermixing, a polymer selected from the class consisting of poly (ar-vinylbenzyl) alkyl- and hydroxyalkyl-substituted quaternary ammonium bases and salts and poly (ar-vinylbenzyl) sulfonium alkyl- and hydroxyalkyl-substituted bases and salt wherein each alkyl or hydroxyalkyl substituent contains not more than 4 carbon atoms, total number of carbon atoms in the alkyl and hydroxyalkyl groups is not greater than 8, and no more than 1 hydroxyalkyl group is present per recurring or repeating unit of the polymer as represented by the bracketed portion of each of the generic structural formulae set out hereinafter).

Examples of the polymer are poly (ar-vinylbenzyl) alkyl and hydroxyalkyl-substituted quaternary ammonium chloride salts employed in the practice of the invention include those of: dimethyl (2-hydroxyethyl); trimethyl; 4-picolinium; 4-methyl morpholinium; pyridinium; 4-(3-hydroxypropyl pyridinium); 4-(2-hydroxyethyl pyridinium); 2-picolinium; 3-picolinium; 4-picolinium; 2,4-lutidinium; triethyl; and tri-n-propyl. Illustrative of the poly (ar-vinylbenzyl) sulfonium compounds useful in the practice of the invention, are those of dimethyl, diethyl, and oxathionium.

Polymers, useful in the practice of the invention, are included in the general class of compositions to which reference is sometimes made as microgels. The term microgel as applied herein is a lightly cross-linked substantially linear polymer which swells and dissolves or disperses in a liquid medium to give a visually continuous and homogeneous liquid composition which, for simplicity of expression, is referred to as a solution in polymer chemistry, whether there is a true solution or a homogeneous substantially stable dispersion of finely divided particles of a colloidal nature. The polymers useful in the practice of the invention swell and dissolve or disperse in aqueous solutions or slurries.

A method of preparing lightly cross-linked substantially linear polymers of the poly (ar-vinylbenzyl) quaternary ammonium type useful in the practice of the invention, is described in U.S. Patent 2,780,604 under Part III thereof. Briefly, the method therein described comprises polymerizing a quaternary ammonium salt of a halomethylated vinyl benzenoid hydrocarbon either alone or with a monovinyl aromatic compound, e.g., styrene or other manufactured ethylenic compounds copolymerizable with styrene, e.g., butadiene, optionally with a small percent of bifunctional cross-linking agent, e.g., diisopropyl benzene or halomethylated divinyl benzene. Modifiers, e.g., dodecyl mercaptan, may be used to control molecular weight of the polymer being produced. The polymerization may be carried out in mass, emulsion, or solution in the presence of a free radical catalyst such as 2 azo-bis-isobutyronitrile or benzoyl peroxide at an elevated temperature. The polymer produced may be considered to have the general formula:

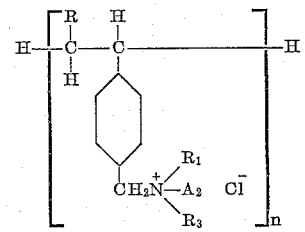

where R is H or $CH_3$ and $R_1$, $R_2$, and $R_3$ are alkyl or hydroxy-alkyl groups containing from 1 to 4 carbon atoms in each group not more than a total of 8 carbon atoms in all these groups, not more than one of $R_1$, $R_2$, or $R_3$ is an hydroxyalkyl group, and $n$ is an integer indicating a plurality of recurring groups between about 20 million and 10 billion, between 40 million and 100 million being most common.

A method of preparing polymers of the poly[(ar-vinylbenzyl)sulfonium] type, useful in the practice of the invention, is described in U.S. applications S.N. 99,979, filed April 3, 1961, which is a continuation-in-part of S.N. 738,939, filed June 2, 1958, now abandoned. The method therein described comprises first obtaining a lightly cross-linked poly vinylbenzyl chloride in latex form, prepared, e.g., according to copending U.S. application S.N. 766,711, filed October 13, 1958. Briefly to make poly vinylbenzyl chloride latex according to S.N. 766,711, an oil-in-water emulsion is prepared with moderate agitation in a suitable reaction vessel. The emulsion consists essentially of 5 to about 40 percent of vinylbenyl chloride and up to about 1 percent of a cross-linking monomer, e.g., divinylbenene based on the weight of the monomer, between about 0.5 and 10 percent of an emulsier and between about 0.1 and 1.0 percent of a peroxy-type initiator and the balance water. Illustrative of suitable emulsifiers to employ are alkaryl sulfonates and alkaryl polyether sulfonates. Illustrative of suitable initiators are ammonium and alkali metal persulfates. The emulsion thus prepared is purged of air, as by passing $N_2$ gas therethrough and heated at between about 10° and 30° C. for about 16 hours to produce the coagulum-free microgel latex.

The polyvinylbenzyl chloride microgel latex thus prepared is then copolymerized in an aqueous or water-miscible alcohol or glycol medium with an organic sulfide, e.g., a dialkyl sulfide, a di(hydroxyalkyl)sulfide, or an alkyl hydroxyalkyl sulfide, wherein the alkyl groups preferably contain between 1 and 4 carbon atoms, e.g., $(CH_3)_2S$. The sulfide monomer is preferably used in excess of the stoichiometric quantity required to react with the vinylbenzyl ammonium chloride microgel. The copolymerization is carried on at between 20° and 70° C., substantially without agitation, for sufficient time to yield a poly[(ar-vinylbenzyl)alkylsulfoniumchloride], a lightly cross-linked homogeneous water-soluble syrupy copolymer having the general formula:

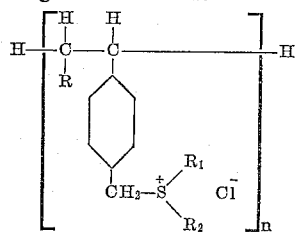

where R is H or methyl and $R_1$ and $R_2$ are alkyl and hydroxyalkyl groups of not more than 4 carbon atoms each and n is an integer, indicating a plurality of recurring groups, of between about 20 million to 10 billion.

Examples were run by admixing a polymer of the type described above with aqueous hydraulic cement slurries to show the effect thereof on the loss of water from the slurry in accordance with the invention.

A blank, for purposes of comparison, and Examples 1 to 16 were run to show the effect of different polymers on the fluid loss of a cement slurry when employed according to the invention. The polymer was employed as a solution consisting by weight of 10 percent polymer, 25 percent isopropanol and 65 percent water. Each of Examples 1 to 16 was run by admixing 50 grams of the aqueous alcohol solution of the microgel polymer, thus prepared, with 200 grams of water and stirring for 1 minute in a Waring Blendor. To the solution thus made were admixed 500 grams of Class A cement, as classified by the American Petroleum Institute and briefly described in API RP 10B, 7th Edition (January 1958). This weight of cement gave a ratio of 1 part microgel to 100 parts of dry cement. Class A cement is considered a standard cement having normal setting time. The following analysis is typical of a dry Class A cement:

Composition: Percent
- Tricalcium silicate _____ 53.4
- Dicalcium silicate _____ 21.5
- Tricalcium aluminate _____ 10.2
- Tetracalcium aluminoferrite _____ 8.2
- Calcium sulfate _____ 3.9

The ratio of water to dry cement employed in the examples was a commonly used ratio of about 50 parts by weight of water (including in this example the polymerized microgel aqueous alcohol solution) to 100 parts of dry cement.

The fluid loss of cement slurries prepared according to the Examples 1 to 16 was determined according to the procedure described in Section IV of API RP 10B and is expressed as milliliters per time interval, e.g., 30 minutes. The polymeric microgel employed in the examples and the fluid loss resulting from an aqueous cement slurry containing the polymeric microgel are set out in Table I.

*Table I*

| Example Number | Fluid Loss Additament | Fluid Loss in Milliliters (API RP 10B) |
|---|---|---|
| Blank | None | >600 in 30 minutes.[1] |
| 1 | Poly [(ar-vinylbenzyl) dimethyl (2-hydroxyethyl) ammonium chloride]. | 21 in 30 minutes. |
| 2 | Poly [(ar-vinylbenzyl) trimethyl ammonium chloride]. | 20 in 30 minutes. |
| 3 | Poly [(ar-vinylbenzyl)-4-picolinium ammonium chloride]. | 20 in 30 minutes. |
| 4 | Poly [(ar-vinylbenzyl) oxathionium chloride]. | 25 in 30 minutes. |
| 5 | Poly [(ar-vinylbenzyl)-4-methylmorpholinium chloride]. | 27 in 30 minutes. |
| 6 | Poly [(ar-vinylbenzyl) pyridinium chloride]. | 29 in 30 minutes. |
| 7 | Poly [(ar-vinylbenzyl) dimethylsulfonium chloride]. | 24 in 30 minutes. |
| 8 | Poly [(ar-vinylbenzyl) diethylsulfonium chloride]. | 40 in 30 minutes. |
| 9 | Poly [(ar-vinylbenzyl) (3-hydroxypropyl) pyridinium chloride]. | 67 in 30 minutes. |
| 10 | Poly [(ar-vinylbenzyl)-2-picolinium chloride]. | 70 in 30 minutes. |
| 11 | Poly [(ar-vinylbenzyl)-2-isoquinolinium chloride]. | 94 in 30 minutes. |
| 12 | Poly [(ar-vinylbenzyl)-3-picolinium chloride. | 80 in 15 minutes. |
| 13 | Poly [(ar-vinylbenzyl)-4-lutidinium chloride]. | 84 in 15 minutes. |
| 14 | Poly [(ar-vinylbenzyl) triethyl ammonium chloride]. | 85 in 7.5 minutes. |
| 15 | Poly [(ar-vinylbenzyl) tri-n-propyl ammonium chloride]. | 80 in 7.5 minutes. |
| 16 | Poly [4-(2-hydroxyethyl) pyridinium chloride]. | 95 in 7.5 minutes. |

[1] This value was obtained by extrapolation because the water loss was too great to permit measurement beyond a minute.

An examination of Table I shows that the fluid loss of an aqueous hydraulic cement slurry is markedly lessened by the presence of 1 part by weight based on 100 parts of the dry cement in the slurry, of a poly (ar-vinylbenzyl) alkyl- or hydroxyalkyl-substituted quaternary ammonium chloride or poly (ar-vinylbenzyl) sulfonium alkyl- or hydroxyalkyl-substituted chloride in accordance with the practice of the invention.

A series of examples was run to show the effect on inhibiting fluid loss from an aqueous cement slurry containing the polymeric microgel in accordance with the invention when the amount of the microgel therein was varied. The poly [(ar-vinylbenzyl) trimethyl ammonium chloride] aqueous alcohol solution employed in Example 2 above was used in this series of examples. The procedure was similar to that followed in the tests above except that the percent of polymer, as above stated, was varied. Table II sets out the actual weight of the polymer in the aqueous alcohol solution which produced satisfactory results.

*Table II*

| Example Number | Percent by Weight Poly [(ar-vinylbenzyl) trimethyl Ammonium Chloride] Used in Slurry | Fluid Loss in Milliliters Per 30 Minutes (API RP 10B) |
|---|---|---|
| 17 | 0.54 | 139 |
| 18 | 0.72 | 81 |
| 19 | 0.90 | 57 |
| 20 | 1.08 | 25 |
| 21 | 1.80 | 4 |

When less than 0.54 part by weight of the microgel per 100 parts of dry cement was used, the reduction in fluid loss dropped off appreciably. However, beneficial results were obtained when as little as 0.25 part was employed. When more than 1.8 parts of the microgel were employed, per 100 of dry cement, the resulting mixture became too viscous to be pumped satisfactorily. Satisfactory results, therefore, were obtained when between 0.25 and 1.8 parts by weight were employed but the amount of microgel recommended is between 0.54 and 1.08, or roughly between 0.5 and 1.1 parts by weight based on the dry cement.

Further examples were run, employing poly [(ar-vinylbenzyl)trimethyl ammonium chloride] which had been polymerised, in a medium in which dodecyl mercaptan was added as a modifier and the divinylbenzene and the dodecyl mercaptan varied, to show the effect of such variations and the resulting extent of cross-linking in the polymer employed on its fluid-loss prevention in aqueous cement slurries. The tests were run similarly to the examples above employing 500 grams of cement, 230 grams of water and 5 grams of the polymer, added as a 10 percent by weight aqueous alcohol solution. Polymers prepared employing the following amounts (expressed in percent by weight of the polymerizable materials in the mixture) of divinylbenzene as the cross-linking monomer and dodecyl mercaptan as the modifier were found to produce best results in the practice of the invention: between 0 and 0.02 percent of dodecyl mercaptan when no divinylbenzene was employed and between 0 and 0.05 percent dodecyl mercaptan with up to 0.15 percent dodecyl mercaptan employed. It is recommended that at least 0.005 percent dodecyl mercaptan be present even though not any divinylbenzene is employed. When divinylbenzene is employed it is highly recommended that at least 0.05 percent dodecyl mercaptan be present.

Whether or not any divinylbenzene is employed in making the copolymer is determined by the particle size of the polymer desired. The large particle size polymer, due to the longer chain growth and little cross-linking, results when little or no divinylbenzene is used. For example, to provide a polymer having an average particle size of about 1200 Angstrom units, no more than 0.025 and preferably about 0.005 percent divinylbenzene is used together with about .02 percent dodecyl mercaptan, based upon the weight of the polymerizable materials present. For producing a polymer having an average particle size of about 600 Angstrom units, it is recommended that up to 0.05 percent divinylbenzene and up to 0.05 percent of dodecyl mercaptan may be employed, the amounts of each being similar in amount.

Examples were run to show the effect on thickening time of the polymeric microgel when admixed with aqueous cement slurries in accordance with the practice of the invention. Class A, E, and D cements were employed. Class D and E cements are regarded as slow setting cements. A typical analysis of a Class D cement is set out in percent by weight below:

Tricalcium silicate _____ 30.7
Dicalcium silicate _____ 45.2
Tetracalcium aluminoferrite _____ 20.1
Calcium sulfate _____ 2.2

A typical analysis of a Class E cement in percent by weight is set out below:

Tricalcium silicate _____ 53.4
Dicalcium silicate _____ 29.9
Tricalcium aluminate _____ 5.6
Tetracalcium aluminoferrite _____ 13.7
Calcium sulfate _____ 3.5
Starch in undetermined qualitative amounts.

Thickening time is considered to be that time required for a slurry to reach a viscosity of 100 poises, for, at that viscosity, it is no longer considered safe to move the slurry without adversely affecting the set cement. The thickening time was measured in this series of examples on a Stanoline Type Super Pressure Consistometer as described in U.S. Patent 2,771,053, wherein the thickening time is determined according to schedules set out in API RP 10B which attempt to simulate varying temperatures and pressure conditions found at different levels in subterranean formations.

Blanks were run employing each of Classes A, D, and E cement, but which contained no microgel and Examples 22, 23, and 24, which employed each of the same classes of cements but which contained 1 percent by weight poly [(ar-vinylbenzyl)trimethyl ammonium chloride]. The microgel was added, as a 10 percent by weight solution in water and methanol, to the water prior to admixing the dry cement therewith to make the slurry. Only the amount of active polymer added is entered on Table III. To prepare the Class A cement slurries employed in the blank and Example 22, 500 grams of cement were admixed with 197.5 grams of water, containing in the case of the example the polymeric microgel. The Class D and Class E cement slurries were made by admixing 500 grams of cement with 167.5 grams of water, which in the case of the examples included the polymeric microgel. Table III sets forth the thickening time for each test.

*Table III*

| Example Number | Class Cement Used | Fluid Loss Control Additament Based on 100 Parts by Weight of Dry Cement | API Schedule No. | Thickening Time In minutes |
|---|---|---|---|---|
| Blank | A | None | 5 | 120 |
| 22 | A | 1.0 | 5 | 80 |
| Blank | D | None | 8 | 103 |
| 23 | D | 1.0 | 8 | 90 |
| Blank | E | None | 18 | 95 |
| 24 | E | 1.0 | 18 | 100 |

An examination of Table III shows that the thickening time was little affected by the presence of the poly (ar-vinylbenzyl) alkyl-substituted ammonium salts employed in accordance with the invention for the reduction of fluid loss.

Additional blanks and examples were run to show the effect of the presence of the fluid loss additive of the invention on the compression strength of the set cement. The blanks and examples were prepared as in Table III employing Class D and E cements. To the examples were added 0.5 and 1.0 percent by weight of poly [(ar-vinylbenzene)trimethyl ammonium chloride].

The compression tests were run according to the method described under "Strength Tests" in Section V of API RP 10B. The curing or setting period used was 24 hours. Examples at both atmospheric pressure at 160° F. and at a pressure of 3000 p.s.i. at 200° F. were used.

It was found that the compression strength of the set cement was somewhat less than 0.5 and 1.0 part of the microgel were used than when none was used but that such compression strength was fully satisfactory for use in well cementing. For example, a Class E cement, when cured at 200° F. and 3000 p.s.i., gave a compression strength of 3740 p.s.i. when no microgel was present, 3665 when 0.5 percent microgel was present, and 3369 p.s.i. when 0.1 percent microgel was present.

It has been found advantageous in the practice of the invention, when cementing wells having a temperature of over about 170° F. in the zone being cemented, that a cement set-retarder, e.g., calcium lignosulfonate, carboxymethylhydroxyethylcellulose, or borax, in an amount of about 0.2 percent by weight, based on the weight of dry cement, be admixed with the cement slurry. Hole temperatures of over 200° F. can then be successfully cemented according to the practice of the invention.

To cement off a zone or to cement a casing in place in a well, the following example is illustrative of the practice of the invention. The amounts given make up about 1000 gallons of slurry.

495 gallons (about 4131 pounds) of water are placed in a suitable mixer, e.g., a truck-mounted rotating drum provided with fixed baffles or a fixed drum provided with moving paddles. To the water are then admixed 125 gallons (about 1044 pounds) of the microgel solution consisting of poly [(ar-vinylbenzyl) trimethyl ammonium chloride] dissolved in a solvent of isopropyl alcohol and water to make a composition consisting of about 10 percent microgel, 25 percent alcohol, and 65 percent water. The mixture thus made is stirred for between about 10 and 15 minutes and then 111 sacks (10,440 pounds) of Class A cement admixed therewith over a period of about 0.5 hour accompanied by continuous stirring.

The slurry thus prepared is then pumped into a well by employing conventional cement slurry pumping equipment according to known practice.

Having described the invention, what is claimed and desired to be protected by Letters Patent is:

1. An aqueous hydraulic cement slurry containing by weight per 100 parts of an hydraulic cement, between 0.25 and 1.8 parts of a polymer selected from the class consisting of poly (ar-vinylbenzyl) alkyl- and hydroxyalkyl-substituted quaternary ammonium bases and salts and poly (ar-vinylbenzyl) sulfonium alkyl- and hydroxyalkyl-substituted bases and salts wherein each alkyl and hydroxyalkyl substituent contains not more than 4 carbon atoms, the total number of carbon atoms in the alkyl and hydroxyalkyl substituted groups is not greater than 8, and no more than 1 hydroxyalkyl group is present in each recurring unit of polymer, and sufficient water to make a pumpable slurry.

2. The aqueous hydraulic cement slurry of claim 1 wherein the polymer is present in the amount of between 0.5 and 1.1 parts per 100 parts of dry cement.

3. The slurry of claim 2 wherein the polymer is a poly [(ar-vinylbenzyl) trialkyl ammonium chloride].

4. The slurry of claim 3 wherein the alkyl groups are methyl.

5. The slurry of claim 2 wherein the polymer is a poly [(ar-vinylbenzyl) dialkyl sulfonium chloride].

6. The slurry of claim 5 wherein the alkyl groups are methyl.

7. The method of cementing a well traversing a subterranean formation which comprises injecting down the well and emplacing in position therein an aqueous hydraulic cement slurry containing by weight per 100 parts of an hydraulic cement, between 0.25 and 1.8 parts of a polymer selected from the class consisting of poly (ar-vinylbenzyl) alkyl- and hydroxyalkyl-substituted quaternary ammonium bases and salts and poly (ar-vinylbenzyl) sulfonium alkyl- and hydroxyalkyl-substituted bases and salts wherein each alkyl and hydroxyalkyl substituent contains not more than 4 carbon atoms, the total number of carbon atoms in the alkyl and hydroxyalkyl-substituted groups is not greater than 8, and no more than 1 hydroxyalkyl group is present in each recurring unit of polymer, and sufficient water to make a pumpable slurry.

8. The method according to claim 7 wherein said polymer is present in the amount of between 0.5 and 1.1 parts per 100 parts of dry cement.

9. The method according to claim 7 wherein said polymer is a poly[(ar-vinylbenzyl)trialkyl ammonium chloride].

10. The method according to claim 7 wherein the alkyl groups in said polymer are methyl groups.

11. The method according to claim 7 wherein said polymer is poly[(ar-vinylbenzyl)dialkyl sulfonium chloride].

No references cited.